(12) United States Patent
Ma

(10) Patent No.: US 9,606,293 B2
(45) Date of Patent: Mar. 28, 2017

(54) BENT TAPER WITH VARYING WIDTHS FOR AN OPTICAL WAVEGUIDE

(71) Applicant: Coriant Advanced Technology, LLC, New York, NY (US)

(72) Inventor: Yangjin Ma, New York, NY (US)

(73) Assignee: Elenion Technologies, LLC, New York, NY (US)

( * ) Notice: Subject to any disclaimer, the term of this patent is extended or adjusted under 35 U.S.C. 154(b) by 0 days.

(21) Appl. No.: 14/754,105

(22) Filed: Jun. 29, 2015

(65) Prior Publication Data

US 2016/0377812 A1 Dec. 29, 2016

(51) Int. Cl.
*G02B 6/27* (2006.01)
*G01M 11/00* (2006.01)

(52) U.S. Cl.
CPC .......... *G02B 6/2766* (2013.01); *G01M 11/33* (2013.01); *G02B 6/2726* (2013.01)

(58) Field of Classification Search
CPC ..... G01M 11/33; G02B 6/2726; G02B 6/2766
USPC ................................. 385/14, 24, 37–43, 147
See application file for complete search history.

(56) References Cited

U.S. PATENT DOCUMENTS

| | | | |
|---|---|---|---|
| 4,999,591 A * | 3/1991 | Koslover | H01P 1/16 333/21 R |
| 6,200,502 B1 * | 3/2001 | Paatzsch | G02B 6/30 205/70 |
| 7,200,308 B2 | 4/2007 | Hochberg | |
| 7,315,611 B2 * | 1/2008 | Cho | A61B 6/032 378/156 |
| 7,333,691 B1 * | 2/2008 | Gill | B82Y 20/00 359/344 |
| 7,339,724 B2 | 3/2008 | Hochberg | |
| 7,424,192 B2 | 9/2008 | Hochberg | |
| 7,480,434 B2 | 1/2009 | Hochberg | |
| 7,539,373 B1 * | 5/2009 | Logvin | G02B 6/12004 385/28 |
| 7,643,714 B2 | 1/2010 | Hochberg | |
| 7,760,970 B2 | 7/2010 | Baehr-Jones | |
| 7,894,696 B2 | 2/2011 | Baehr-Jones | |
| 8,031,985 B2 | 10/2011 | Hochberg | |
| 8,067,724 B2 | 11/2011 | Hochberg | |
| 8,098,965 B1 | 1/2012 | Baehr-Jones | |
| 8,203,115 B2 | 6/2012 | Hochberg | |

(Continued)

OTHER PUBLICATIONS

Dai et al.; "Novel Concept for Ultracompact Polarization Splitter-rotator Based on Silicon Nanowires"; Optics Express; vol. 19, No. 11; May 23, 2011; (10 pages).

(Continued)

*Primary Examiner* — Akm Enayet Ullah
(74) *Attorney, Agent, or Firm* — Nixon Peabody LLP

(57) ABSTRACT

A SOI bent taper structure is used as a mode convertor. By tuning the widths of the bent taper and the bend angles, almost lossless mode conversion is realized between TE0 and TE1 in a silicon waveguide. The simulated loss is <0.05 dB across C-band. This bent taper can be combined with bi-layer TM0-TE1 rotator to reach very high efficient TM0-TE0 polarization rotator. An ultra-compact (9 µm) bi-layer TM0-TE1 taper based on particle swarm optimization is demonstrated. The entire TM0-TE0 rotator has a loss <0.25 dB and polarization extinction ratio >25 dB, worst-case across the C-band.

15 Claims, 10 Drawing Sheets

(56) References Cited

U.S. PATENT DOCUMENTS

| | | | |
|---|---|---|---|
| 8,237,102 B1 | 8/2012 | Baehr-Jones | |
| 8,258,476 B1 | 9/2012 | Baehr-Jones | |
| 8,270,778 B2 | 9/2012 | Hochberg | |
| 8,280,211 B1 | 10/2012 | Baehr-Jones | |
| 8,311,374 B2 | 11/2012 | Hochberg | |
| 8,340,486 B1 | 12/2012 | Hochberg | |
| 8,380,016 B1 | 2/2013 | Hochberg | |
| 8,390,922 B1 | 3/2013 | Baehr-Jones | |
| 8,798,406 B1 | 8/2014 | Hochberg | |
| 8,818,141 B1 | 8/2014 | Hochberg | |
| 9,470,844 B1* | 10/2016 | Ma | G02B 6/126 |
| 2002/0122630 A1 | 9/2002 | Bona | |
| 2002/0154863 A1* | 10/2002 | Mizuno | G02B 6/12011 385/43 |
| 2003/0174960 A1* | 9/2003 | Lam | G02B 6/125 385/48 |
| 2004/0071384 A1 | 4/2004 | Heim | |
| 2004/0091211 A1* | 5/2004 | Umebayshi | G02B 6/125 385/49 |
| 2004/0151423 A1* | 8/2004 | Izhaky | G02B 6/1228 385/21 |
| 2005/0152641 A1* | 7/2005 | Han | G02B 6/12016 385/24 |
| 2006/0037646 A1* | 2/2006 | Wilhelm | F16K 17/0433 137/514.3 |
| 2006/0204175 A1* | 9/2006 | Laurent-Lund | G02B 6/1228 385/43 |
| 2009/0232445 A1* | 9/2009 | Jeong | G02B 6/1228 385/14 |
| 2010/0158437 A1* | 6/2010 | Decorby | B82Y 20/00 385/14 |
| 2014/0133796 A1 | 5/2014 | Dong | |

OTHER PUBLICATIONS

Sacher et al.; "Polarization Rotator-Splitters in Standard Active Silicon Photonics Platforms"; Optics Express 3777; vol. 22, No. 4; Feb. 24, 2014; (10 pages).
International Search Report, PCT/US2016/040213, date of mailing Sep. 28, 2016 (5 pages).
Written Opinion of the International Searching Authority, PCT/US2016/040213, date of mailing Sep. 28, 2016 (5 pages).

* cited by examiner

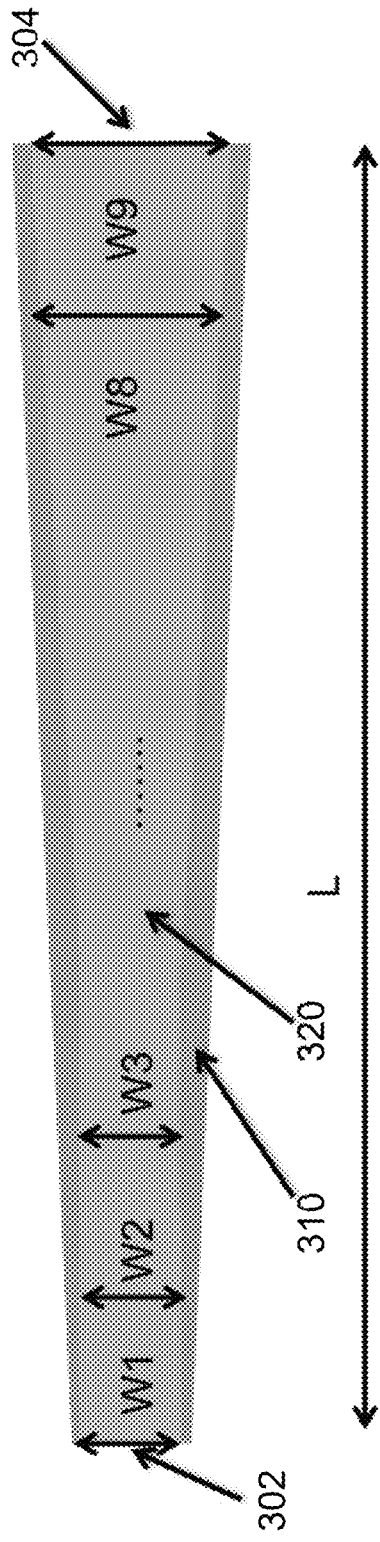
FIG. 3
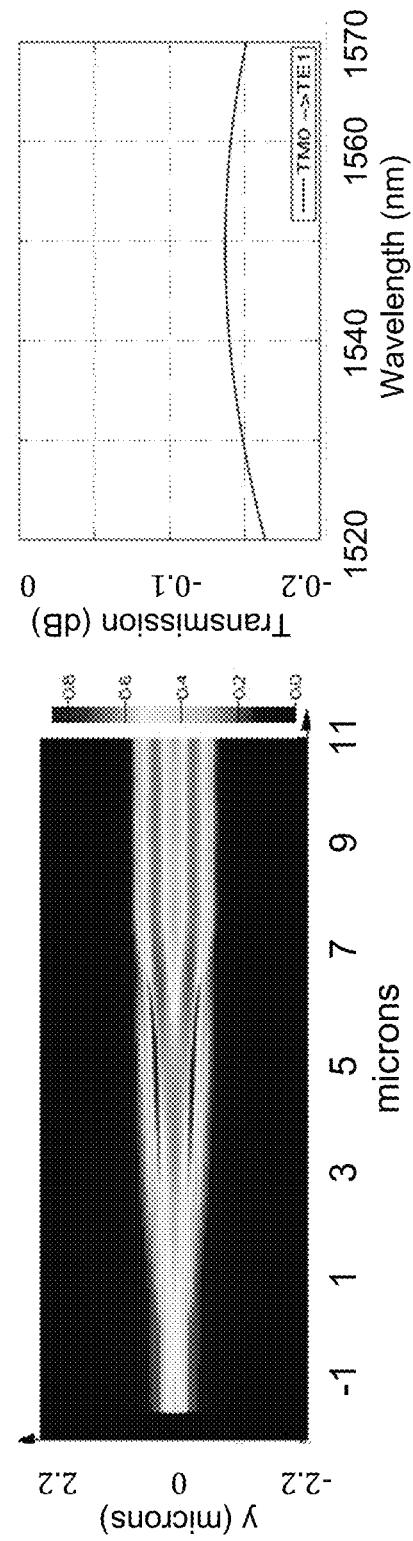
FIG. 4A
FIG. 4B

BENT TAPER WITH VARYING WIDTHS FOR AN OPTICAL WAVEGUIDE

FIELD OF THE INVENTION

The invention relates to optical waveguides in general and particularly to a taper optical waveguide.

BACKGROUND OF THE INVENTION

Conventional integrated optics customarily uses tapers for various purposes. Examples are an adiabatic mode size convertor, an edge coupler taper, and a bi-layer mode convertor taper. Such tapers are conventionally fabricated as linear tapers. Another conventional approach is to use single mode waveguides for waveguide bending, to avoid multi-mode mixing.

There is a need for improved optical waveguide taper components.

SUMMARY OF THE INVENTION

According to one aspect, the invention features an optical waveguide component, comprising: a bent taper having an input port and an output port, the bent taper having a length, the bent taper having at least one bent waveguide segment, the bent taper having a varying waveguide width at at least two different locations along the length.

In one embodiment, the bent taper has a shape similar to the letter "S", a center radius $R_0$, and an offset dy measured as a lateral distance between the input and output ports, the bent taper configured to be represented as a plurality of segments of angular measure $d_\theta$.

In one embodiment, each of the plurality of segments of angular measure $d_\theta$ has the same angular measure.

In another embodiment, at least two of the plurality of segments of angular measure $d_\theta$ have different angular measure.

In a further embodiment, the bent taper has a shape similar to the letter "L".

In yet another embodiment, the bent taper is configured as a mode converter.

In still another embodiment, the input port of the bent taper is in optical communication with an output port of a bi-layer taper, the bi-layer taper having an input port, a length, and a plurality of widths wj at different locations j along the length, where j is an ordinal number.

In a further embodiment, the bent taper is configured as a polarization rotator.

In an additional embodiment, the polarization rotator includes a TM0-TE1 mode conversion taper in combination with the bent taper, the bent taper configured to provide TE1-TE0 mode conversion.

In one more embodiment, the polarization rotator includes an input configured to receive a TM0 mode, a mode conversion element configured to convert the TM0 mode to an intermediate mode, and the bent taper is configured to convert the intermediate mode to a TE0 mode.

In yet a further embodiment, the optical waveguide component is configured to operate at a wavelength within the range of a selected one of an O-Band, an E-band, a C-band, an L-Band, an S-Band and a U-band.

According to another aspect, the invention relates to a method of making an optical waveguide component, comprising the step of: providing a bent taper having an input port and an output port, the bent taper having a length, the bent taper having at least one bent waveguide segment, the bent taper having a varying waveguide width at at least two different locations along the length.

In one embodiment, the bent taper has a shape similar to the letter "S", a center radius $R_0$, and an offset dy measured as a lateral distance between the input and output ports, the bent taper configured to be represented as a plurality of segments of angular measure $d_\theta$.

In a further embodiment, the bent taper has a shape similar to the letter "L".

According to another aspect, the invention relates to a method of using an optical waveguide component, comprising the steps of: providing a bent taper having an input port and an output port, the bent taper having a length, the bent taper having at least one bent waveguide segment, the bent taper having a varying waveguide width at at least two different locations along the length; applying an optical signal to the input port of the bent optical taper; sensing a response optical signal at the output port of the bent optical taper; and performing at least one of recording the response optical signal, transmitting the response optical signal to a data handling system, or to displaying the response optical signal to a user.

In one embodiment, the bent taper has a shape similar to the letter "S", a center radius $R_0$, and an offset dy measured as a lateral distance between the input and output ports, the bent taper configured to be represented as a plurality of segments of angular measure $d_\theta$.

In a further embodiment, the bent taper has a shape similar to the letter "L".

In one embodiment, the response optical signal is a mode converted optical signal of the input optical signal.

In another embodiment, the optical waveguide component is configured to operate at a wavelength within the range of a selected one of an O-Band, an E-band, a C-band, an L-Band, an S-Band and a U-band.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 3 is a schematic drawing of a TM0-TE1 bi-layer taper

FIG. 4A is a graph showing the simulated mode transition of a TM0-TE1 convertor.

FIG. 4B is a graph of the simulated loss of the converter of FIG. 4A.

DETAILED DESCRIPTION

Acronyms

A list of acronyms and their usual meanings in the present document (unless otherwise explicitly stated to denote a different thing) are presented below.

AMR Adiabatic Micro-Ring
APD Avalanche Photodetector
ARM Anti-Reflection Microstructure
ASE Amplified Spontaneous Emission
BER Bit Error Rate
BOX Buried Oxide
CMOS Complementary Metal-Oxide-Semiconductor
CMP Chemical-Mechanical Planarization
DBR Distributed Bragg Reflector
DC (optics) Directional Coupler
DC (electronics) Direct Current
DCA Digital Communication Analyzer
DRC Design Rule Checking
DSP Digital Signal Processor
DUT Device Under Test
ECL External Cavity Laser
E/O Electro-optical
FDTD Finite Difference Time Domain
FFE Feed-Forward Equalization
FOM Figure of Merit
FSR Free Spectral Range
FWHM Full Width at Half Maximum
GaAs Gallium Arsenide
InP Indium Phosphide
LiNO$_3$ Lithium Niobate
LIV Light intensity(L)-Current(I)-Voltage(V)
MFD Mode Field Diameter
MPW Multi Project Wafer
NRZ Non-Return to Zero
OOK On-Off Keying
PIC Photonic Integrated Circuits
PRBS Pseudo Random Bit Sequence
PDFA Praseodymium-Doped-Fiber-Amplifier
PSO Particle Swarm Optimization
Q Quality factor $$Q = 2\pi \times \frac{\text{Energy Stored}}{\text{Energy dissipated per cycle}} = 2\pi f_r \times \frac{\text{Energy Stored}}{\text{Power Loss}}.$$

QD Quantum Dot
RSOA Reflective Semiconductor Optical Amplifier
SOI Silicon on Insulator SEM Scanning Electron Microscope
SMSR Single-Mode Suppression Ratio
TEC Thermal Electric Cooler
WDM Wavelength Division Multiplexing We describe a novel taper structure using a multimode bent taper.

The optical behavior of a multimode bend is defined by its geometry. By changing the bend width along with its angle, a bent taper can be formed.

In some embodiments, a bent taper is one that has one or more bent waveguide segments and that has a varying waveguide width at at least two different locations along a length of the waveguide. A bent taper can have a shape similar to the letter "S", the letter "L", or some other bent shape.

One can achieve more functions than a single mode bend by utilizing the multimode region if one can control the behavior of a multimode bend. One application of a bent taper constructed and operated according to the principles of the invention is use as a mode convertor that can be used in optical waveguides, which is an important category of structures in integrated optics to realize polarization diversified photonic integrated circuit (PIC). Another application of a bent taper constructed and operated according to the principles of the invention is use as a polarization rotator that can be used in optical waveguides. The bent tapers constructed and operated according to the principles of the invention can be used in applications such as mode division multiplexing (MDM), wavelength division multiplexing (WDM), polarization division multiplexing (PDM) or in combinations of multiplexing methods.

Figure 1:
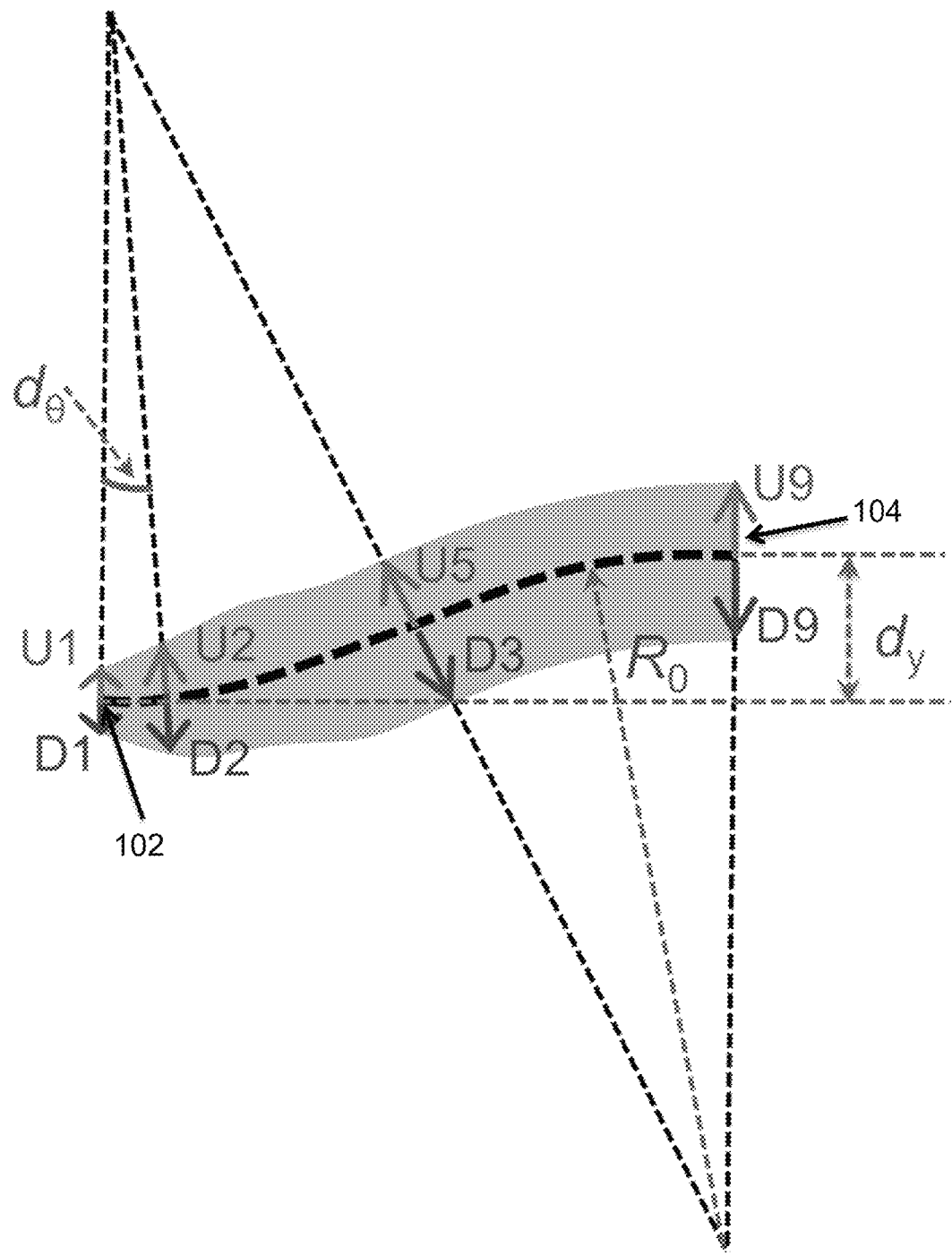
FIG. 1 is a schematic diagram of an embodiment of a bent taper constructed according to principles of the invention.

FIG. 1 is a schematic diagram of an embodiment of a bent taper constructed according to principles of the invention. The bent taper starts with an S-bend that has an optical input port 102 at one end and an optical output port 104 at the other end. The device is reciprocal so 102 can also serve as an output port and 104 an input port. The bent taper has a length measured as a distance from the input port to the output port. An S-bend waveguide can be defined by three factors: the center radius $R_0$, the vertical offset dy measured as a lateral distance between the input and output ports, and the waveguide width. The waveguide width can vary at different angles and/or at different locations in the waveguide.

A highly efficient TE0-TE1 mode convertor is realized in one embodiment with a bent taper. In this design, we decompose the S-bend into 8 segments of equal angular measure, $d_\theta$, and perform interpolation between each segment to make the transitions from one segment to the next smooth. In other embodiments, the angular measure may differ for different ones of the plurality of segments. The waveguide width of an S-bend is taken relative to the center radius $R_0$. The center radius $R_0$ divides the S-bend into the "up" side and the "down" side. In the embodiment illustrated, we choose asymmetric widths to increase the optimization freedom. Therefore, we have two sets of independent width parameters: {U1, U2, U3, . . . , U9} on the "up" side and {D1, D2, D3, . . . , D9} on the "down" side, as shown in in FIG. 1. The width of the taper at any specific location i is the sum of the respective Ui and Di at location i, where i is an ordinal number.

The TE0 mode is launched at the narrow end, or input port, e.g., the left side in FIG. 1 and TE1 mode emerges at the wide end, or output port, e.g., the right side in FIG. 1. Particle swarm optimization (PSO) is used during FDTD simulation to achieve an optimized geometry. Ultra-high efficiency was realized by only modifying the first two segments (U1, U2, D1, D2). The remaining six segments were maintained at the same widths as at the wide end. By fixing dy to 1.2 µm, $R_0$ is found to be 8.531 µm after optimization. The length of the bend taper is calculated to be only 6.3 µm.

Figure 2A:
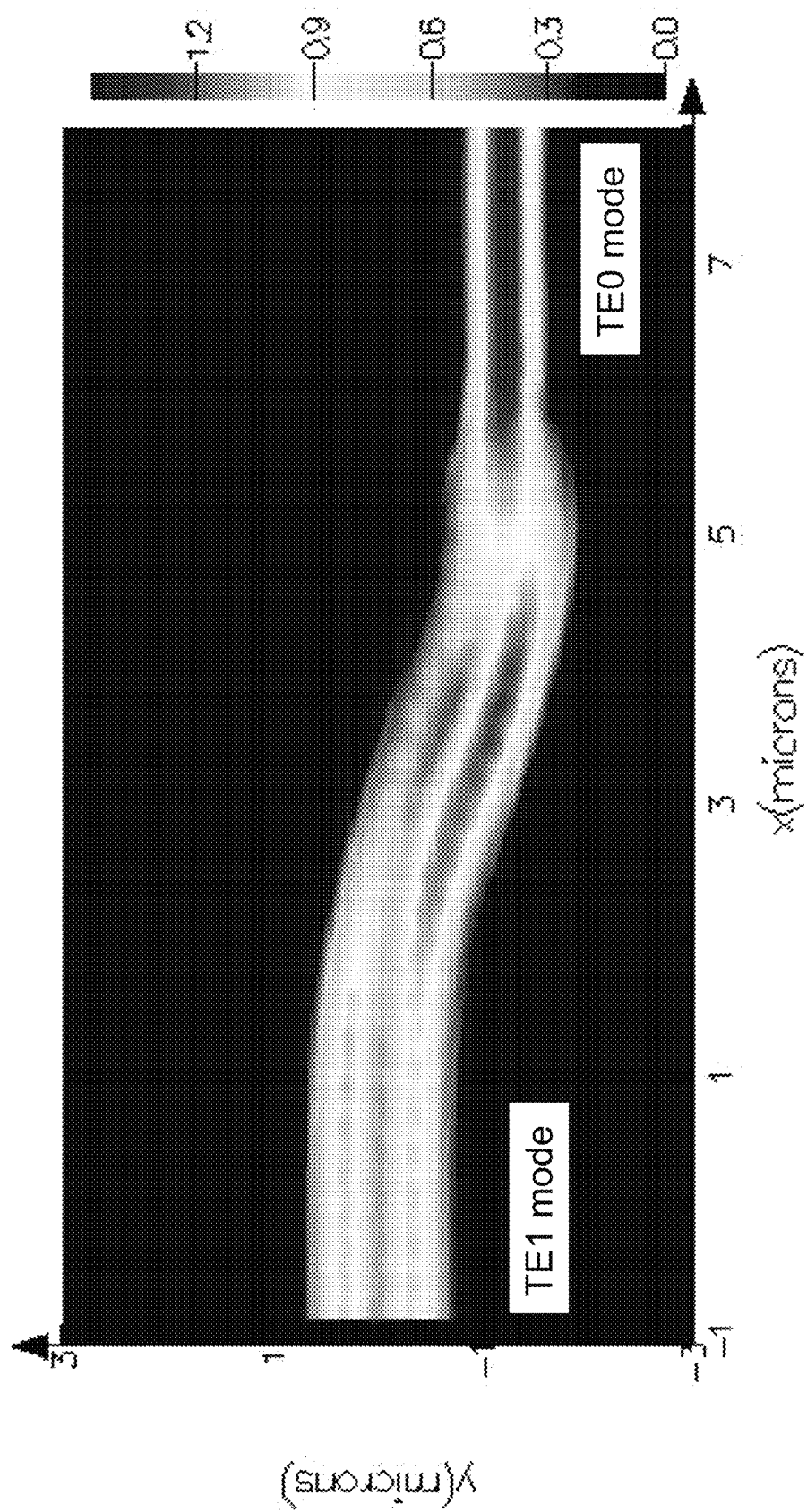
FIG. 2A is a graph showing the E-field of a bent taper TE0-TE1 convertor.

FIG. 2A is a graph showing the E-field of a bent taper TE0-TE1 convertor. FIG. 2A clearly shows the field transition from TE1 at the left to TE0 at the right without notable scattering loss.

Figure 2B:
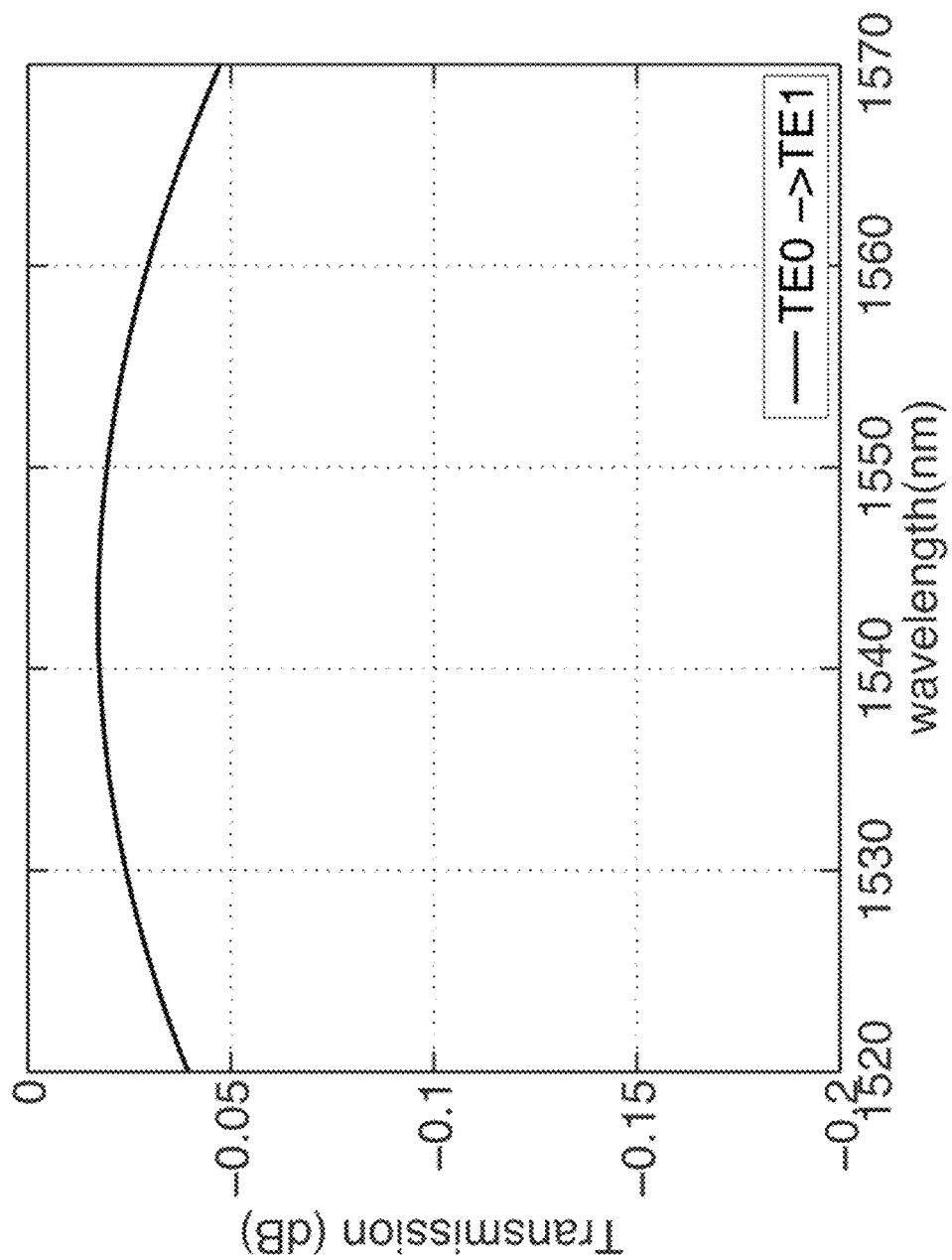
FIG. 2B is a graph of the simulated loss of the bent taper converter of FIG. 2A.

FIG. 2B is a graph of the simulated loss of the bent taper converter of FIG. 2A. The mode conversion loss is <0.05 dB (i.e., >98.8% efficiency) across the C-band.

The TE0-TE1 convertor can be combined with a TM0-TE1 convertor to realize polarization rotation in a SOI platform. A TM0-TE1 convertor can be realized by using a linear bi-layer taper, as been published. See D. Dai and J. E. Bowers, Opt. Express 19, 10940 (2011); and W. D. Sacher, T. Barwicz, B. J. F. Taylor, and J. K. S. Poon, Opt. Express 22, 3777 (2014). However, the mode conversion of those tapers is not efficient. In order to achieve high conversion efficiency (>95%), the length of the linear adiabatic taper is usually around a hundred micrometers or even longer.

FIG. 3 is a schematic drawing of a TM0-TE1 bi-layer taper. The taper has an input port 302, an output port 304, a first layer 310, and a second layer 320, an input port 302. We designed the widths w1, w2, w3, ... w8, w9, of bi-layer taper by PSO to realize an ultra-short TM0-TE1 bi-layer taper. The taper length is only 9 µm, which is at least an order of magnitude shorter than reported in the literature. Even with the short length, the loss remains small, <0.2 dB across the C-band, which is comparable or even better than those reported.

FIG. 4A is a graph showing the simulated mode transition of a TM0-TE1 convertor.

FIG. 4B is a graph of the simulated loss of the converter of FIG. 4A.

Finally, we can combine these two parts as a polarization rotator. The field transition is shown in FIG. 5A through FIG. 5D.

Figures 5A, 5B, 5C, 5D:
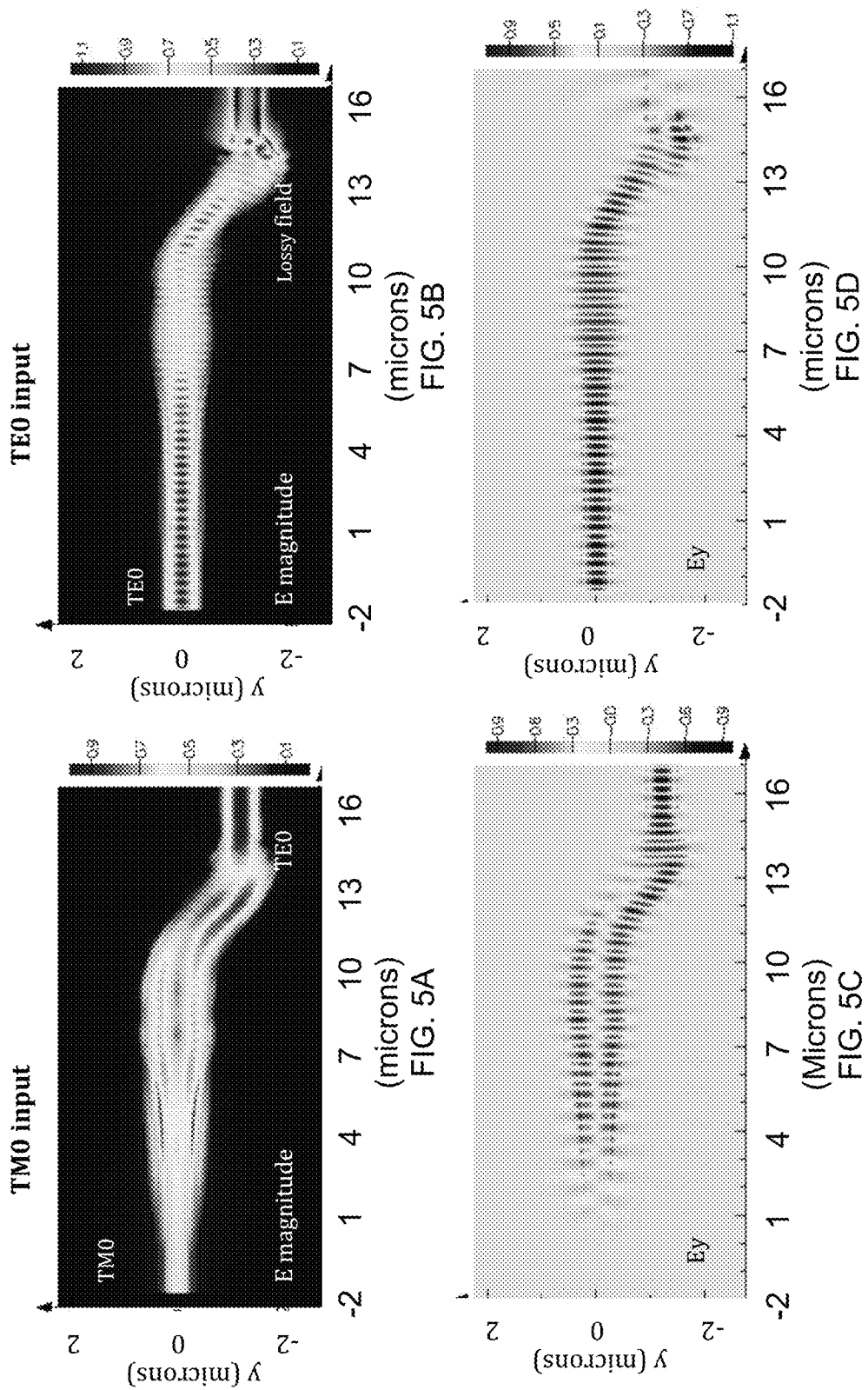
FIG. 5A is a contour plot showing the magnitude of E-field for a TM0 input, TE0 output bent taper polarization rotator.
FIG. 5B is a contour plot showing the magnitude of E-field for a TE0 input bent taper polarization rotator.
FIG. 5C is a contour image of the field transitions of Ey component for the bent taper polarization rotator of FIG. 5A.
FIG. 5D is a contour image of the field transitions of Ey component for the bent taper polarization rotator of FIG. 5B.

FIG. 5A is a contour plot showing the magnitude of E-field for a TM0 input, TE0 output bent taper polarization rotator.

FIG. 5B is a contour plot showing the magnitude of E-field for a TE0 input bent taper polarization rotator.

FIG. 5C is a contour image of the field transitions of Ey component for the bent taper polarization rotator of FIG. 5A.

FIG. 5D is a contour image of the field transitions of Ey component for the bent taper polarization rotator of FIG. 5B.

As clearly seen, when the bent taper polarization rotator receives an input signal with TM0 mode at left, the TM0 mode first transfers to TE1 mode at the bi-layer part and is then converted to TE0 mode at the narrow end of the bent taper. However, when the bent taper polarization rotator receives an input signal with TE0 mode, TE0 mode remains all the way across the bi-layer taper and gets scattered at the bent taper, as shown in the right half of FIG. 5B. The simulated performance versus wavelength is given in FIG. 6A through FIG. 6D.

Figure 6A:
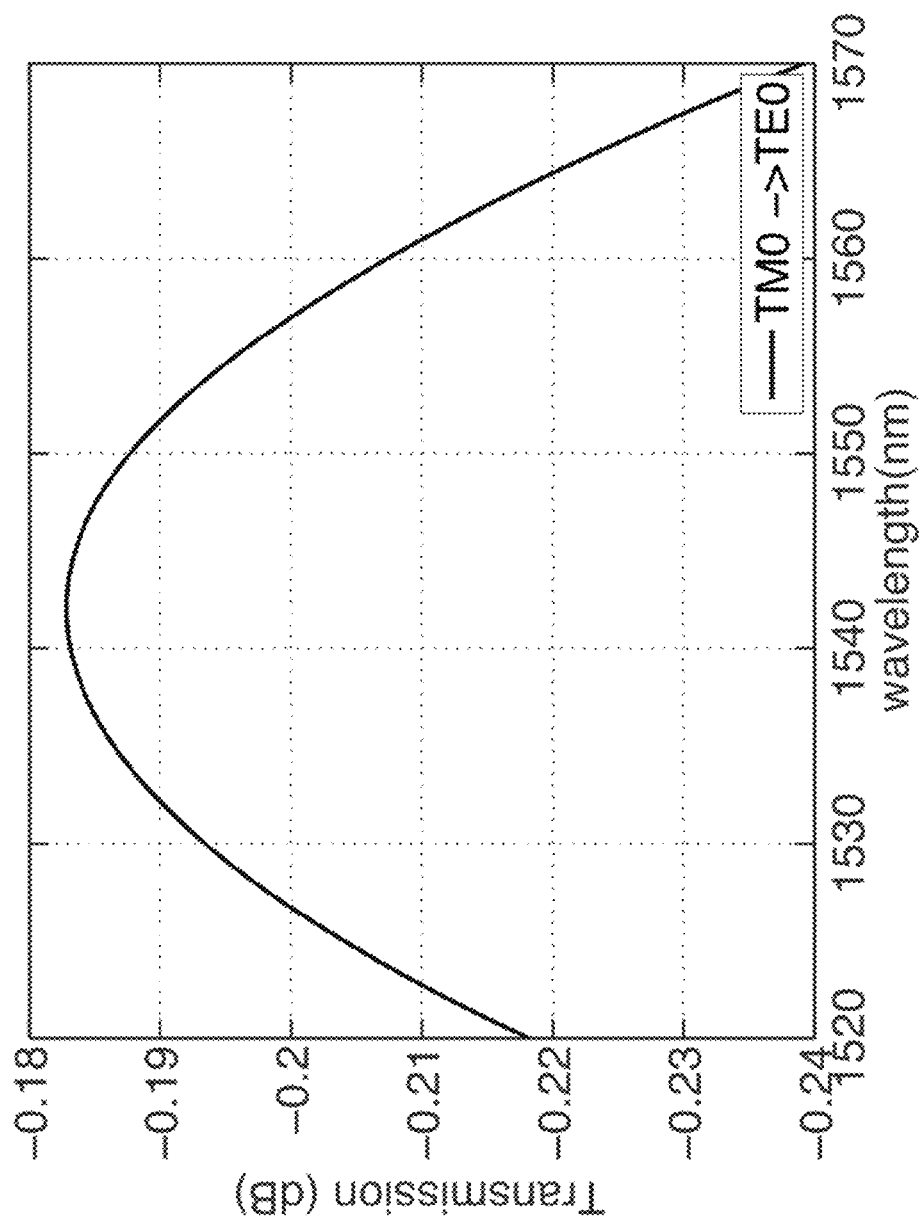
FIG. 6A is a graph of the simulated performance has a function of wavelength for the TM0 to TE0 mode conversion of an embodiment of a bent taper converter.

FIG. 6A is a graph of the simulated performance has a function of wavelength for the TM0 to TE0 mode conversion of an embodiment of a bent taper converter.

As clearly shown in FIG. 6A, the total loss of the novel polarization rotator is <0.24 dB across C-band, peaked at around 1550 nm.

Figure 6B:
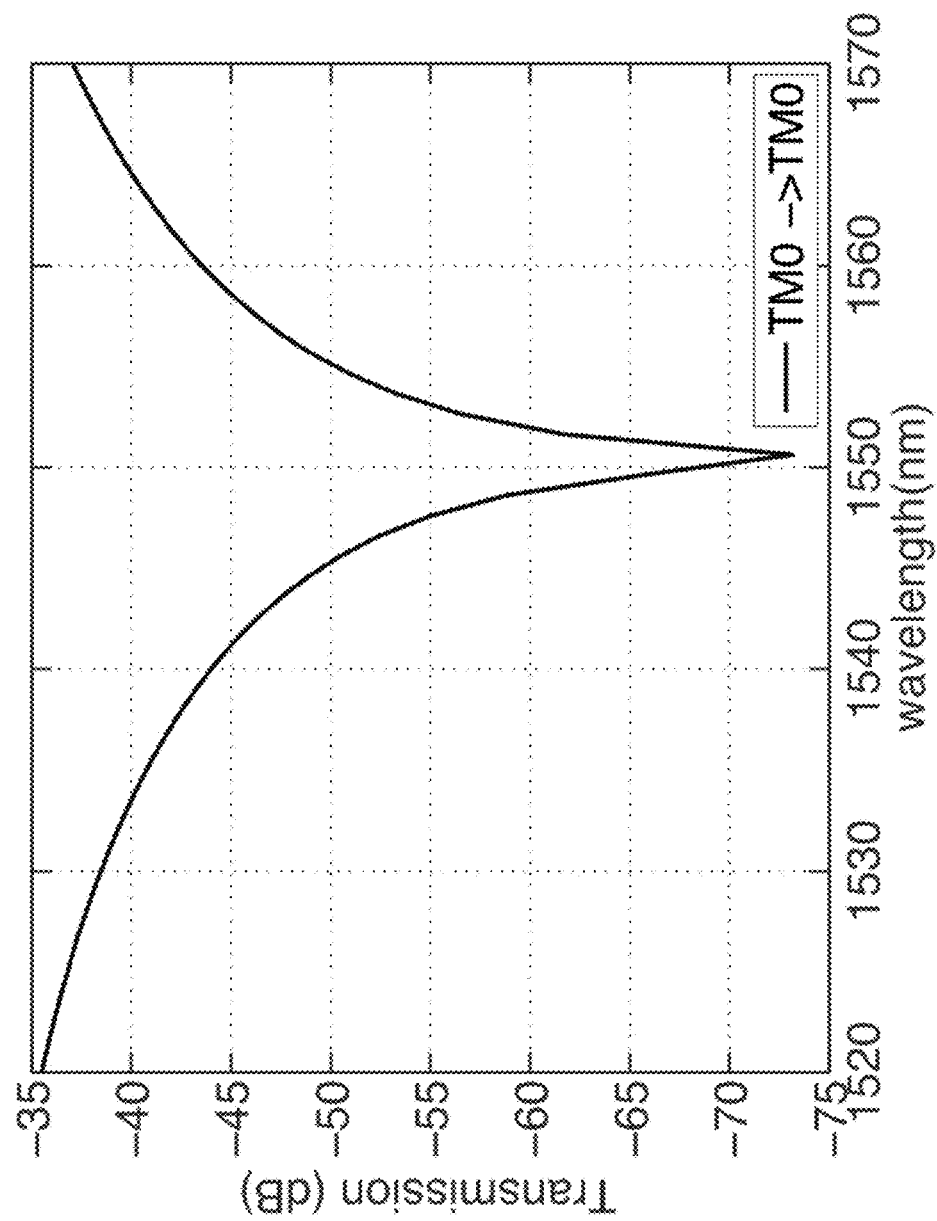
FIG. 6B is a graph of the simulated performance has a function of wavelength for the TM0 to TM0 transmission of an embodiment of a bent taper converter.

FIG. 6B is a graph of the simulated performance has a function of wavelength for the TM0 to TM0 transmission of an embodiment of a bent taper converter. Almost no TM0 information remained. As shown in FIG. 6B, the polarization extinction ratio (PER) for TM0 input is >35 dB across C-band.

Figure 6C:
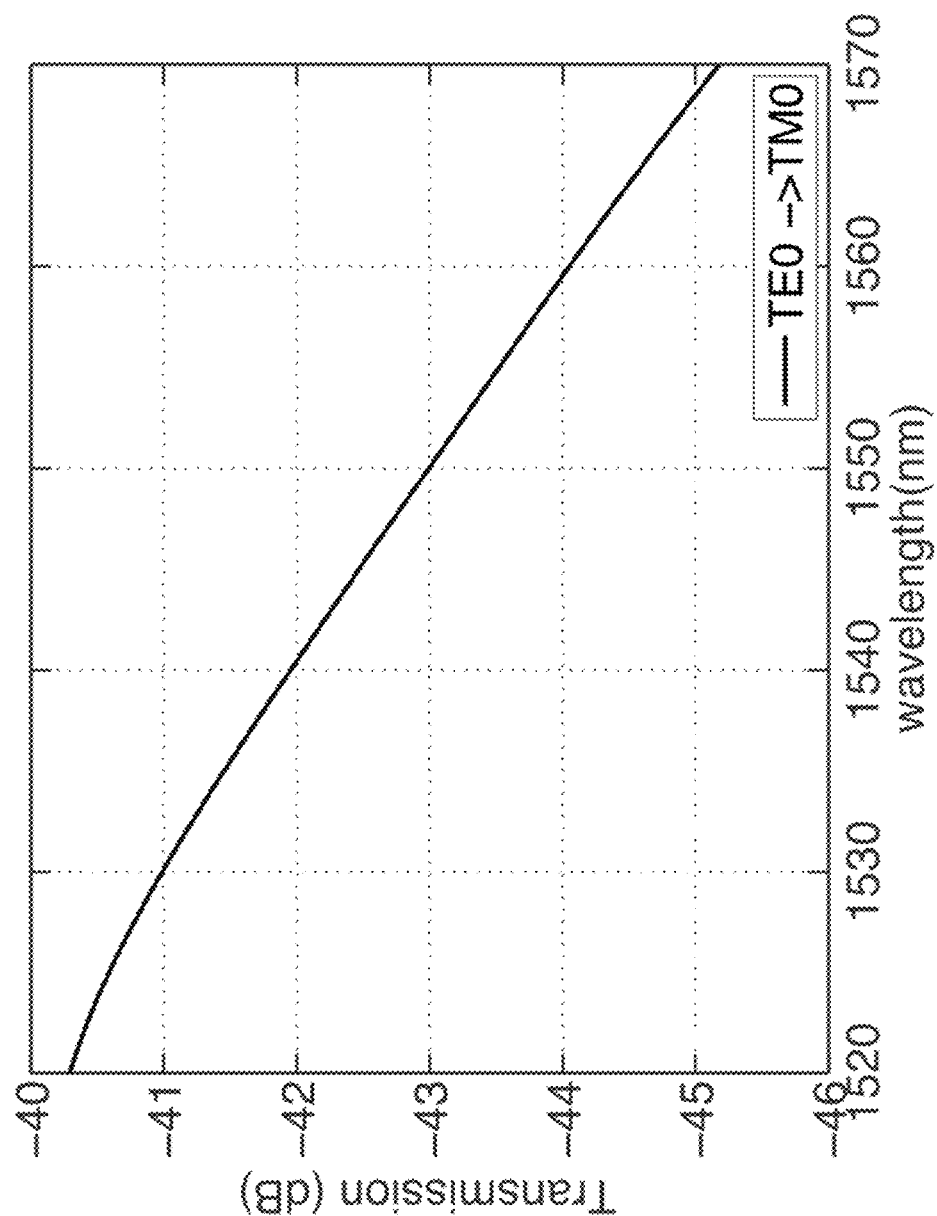
FIG. 6C is a graph of the simulated performance has a function of wavelength for the TE0 to TM0 mode conversion of an embodiment of a bent taper converter.
Figure 6D:
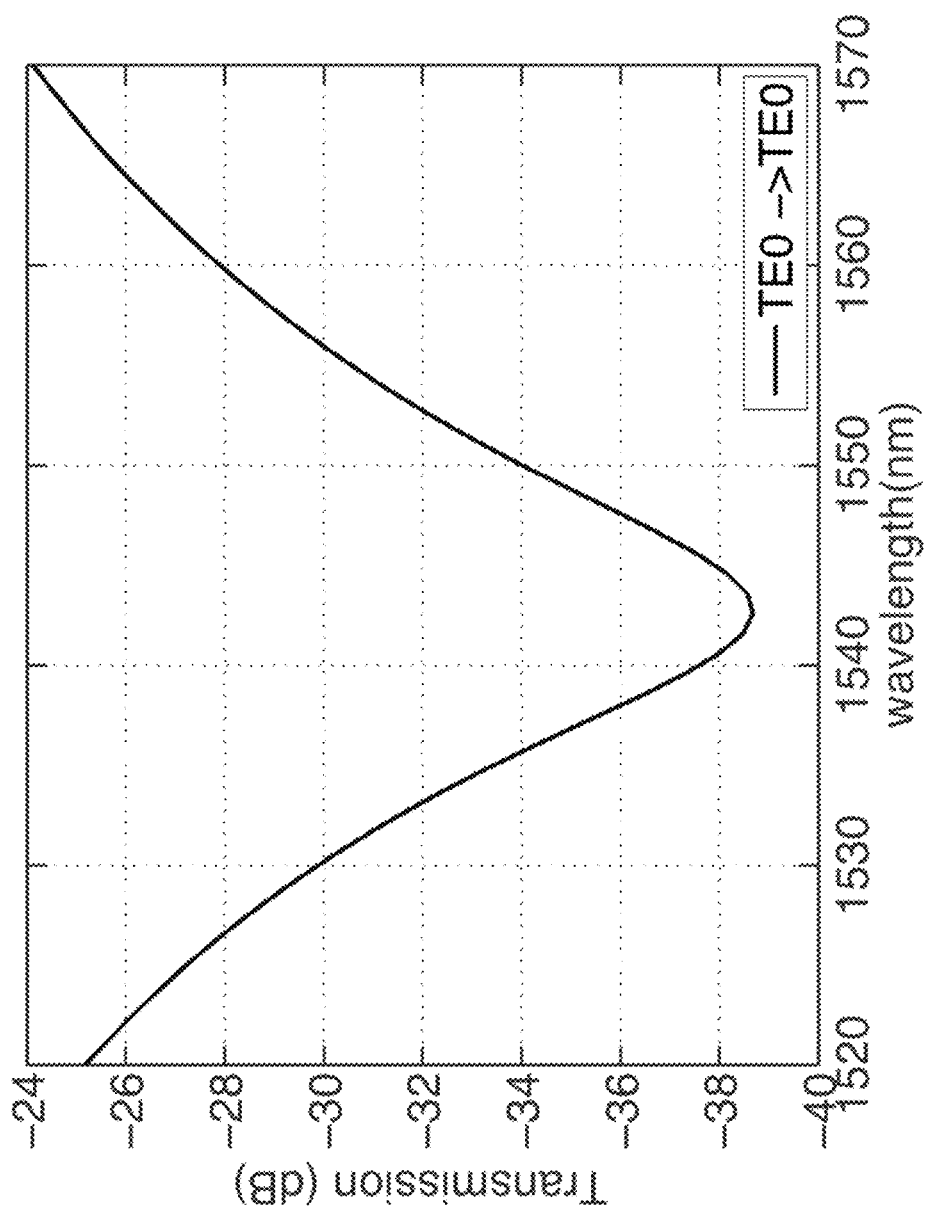
FIG. 6D is a graph of the simulated performance has a function of wavelength for the TE0 to TE0 transmission of an embodiment of a bent taper converter.

FIG. 6C is a graph of the simulated performance has a function of wavelength for the TE0 to TM0 mode conversion of an embodiment of a bent taper converter. As in FIG. 6C, barely any polarization crosstalk (<−40 dB) is observed. TE0->TM0 conversion is unwanted since it induces polarization crosstalk. FIG. 6D is a graph of the simulated performance has a function of wavelength for the TE0 to TE0 transmission of an embodiment of a bent taper converter. When launching the $TE_0$ mode at the left side, significant power loss occurs due to scattering, resulting >25 dB loss across C-band (FIG. 6(d)).

Figure 7:
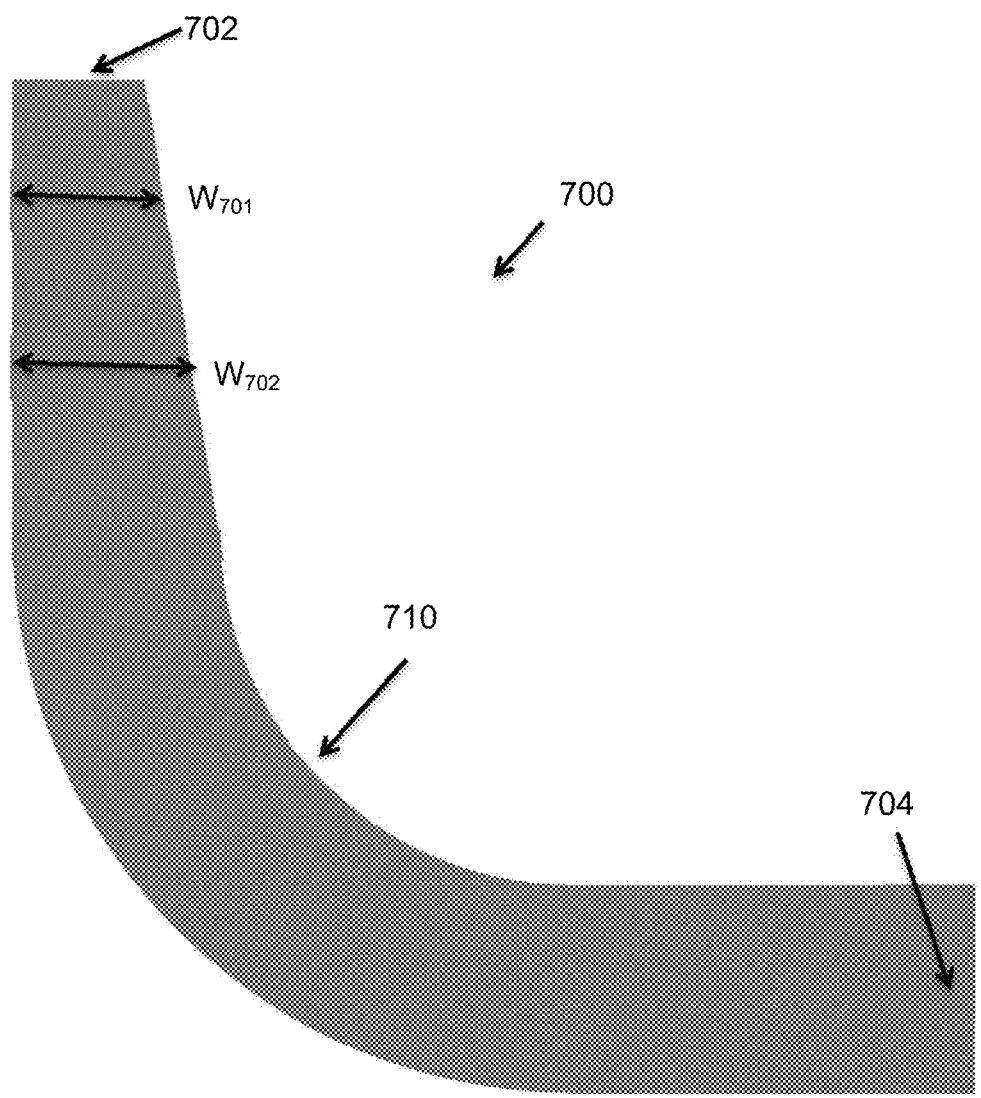
FIG. 7 is an embodiment of an "L" shaped bent taper.

FIG. 7 is a first embodiment of an "L" shaped bent taper 700. As illustrated in FIG. 7, the bent taper 700 has an input port 702 and an output port 704. A bend 710 is also present. The bent taper 700 has a plural number of widths that are different, but only two such widths, $W_{701}$ and $W_{702}$, are illustrated.

It is believed that apparatus constructed using principles of the invention and methods that operate according to principles of the invention can be used in the wavelength ranges described in Table I.

TABLE I

| Band | Description | Wavelength Range |
| --- | --- | --- |
| O band | original | 1260 to 1360 nm |
| E band | extended | 1360 to 1460 nm |
| S band | short wavelengths | 1460 to 1530 nm |
| C band | conventional ("erbium window") | 1530 to 1565 nm |
| L band | long wavelengths | 1565 to 1625 nm |
| U band | ultralong wavelengths | 1625 to 1675 nm |

It is believed that in various embodiments, mode converters and polarization rotators can be fabricated that are able to operate at a wavelength within the range of a selected one of an O-Band, an E-band, a C-band, an L-Band, an S-Band and a U-band.

It is believed that apparatus constructed using principles of the invention and methods that operate according to principles of the invention can be fabricated using materials systems other than silicon or silicon on insulator. Examples of materials systems that can be used include materials such as compound semiconductors fabricated from elements in Groups III and V of the Periodic Table (e.g., compound semiconductors such as GaAs, AlAs, GaN, GaP, InP, and alloys and doped compositions thereof).

Design and Fabrication

Methods of designing and fabricating devices having elements similar to those described herein are described in one or more of U.S. Pat. Nos. 7,200,308, 7,339,724, 7,424, 192, 7,480,434, 7,643,714, 7,760,970, 7,894,696, 8,031,985, 8,067,724, 8,098,965, 8,203,115, 8,237,102, 8,258,476, 8,270,778, 8,280,211, 8,311,374, 8,340,486, 8,380,016, 8,390,922, 8,798,406, and 8,818,141, each of which documents is hereby incorporated by reference herein in its entirety.

DEFINITIONS

As used herein, the term "optical communication channel" is intended to denote a single optical channel, such as light that can carry information using a specific carrier wavelength in a wavelength division multiplexed (WDM) system.

As used herein, the term "optical carrier" is intended to denote a medium or a structure through which any number of optical signals including WDM signals can propagate, which by way of example can include gases such as air, a void such as a vacuum or extraterrestrial space, and structures such as optical fibers and optical waveguides.

THEORETICAL DISCUSSION

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. An optical waveguide component, comprising:
a bent taper having an input port and an output port, said bent taper having a length, said bent taper having at least one bent waveguide segment, said bent taper having a varying waveguide width at at least two different locations along said length;
wherein said bent taper has a shape similar to the letter "S," a center radius $R_0$, and an offset dy measured as a lateral distance between said input and output ports, said bent taper configured to be represented as a plurality of segments of angular measure $d_\theta$.

2. The optical waveguide component of claim 1, wherein each of said plurality of segments of angular measure $d_\theta$ has the same angular measure.

3. The optical waveguide component of claim 1, wherein at least two of said plurality of segments of angular measure $d_\theta$ have different angular measure.

4. The optical waveguide component of claim 1, wherein said bent taper is configured as a mode converter.

5. The optical waveguide component of claim 1, further comprising a bi-layer taper comprising: an input port, an output port, a length, and a plurality of widths w_ja, w_jb at different locations j along said length, where ja and jb are ordinal numbers for first and second layers, respectively;
wherein said input port of said bent taper is in optical communication with the output port of a bi-layer taper.

6. The optical waveguide component of claim 5, wherein said bi-layer taper and said bent taper are configured as a polarization rotator.

7. The optical waveguide component of claim 6, wherein said bi-layer taper is configured to provide a TM0-TE1 mode conversion; and wherein said bent taper is configured to provide TE1-TE0 mode conversion.

8. The optical waveguide component of claim 1, further comprising a mode conversion element configured to convert a TM0 mode to an intermediate mode, and wherein said bent taper is configured to convert said intermediate mode to a TE0 mode.

9. The optical waveguide component of claim 1, configured to operate at a wavelength within the range of a selected one of an O-Band, an E-band, a C-band, an L-Band, an S-Band and a U-band.

10. An optical waveguide component, comprising:
a bent taper having an input port and an output port, said bent taper having a length, said bent taper having at least one bent waveguide segment, said bent taper having a varying waveguide width at at least two different locations along said length; and
a bi-layer taper comprising: an input port, an output port, a length, and a plurality of widths w_ja, w_jb at different locations j along said length, where ja and jb are ordinal numbers for first and second layers, respectively;
wherein said input port of said bent taper is in optical communication with the output port of a bi-layer taper.

11. The optical waveguide component of claim 10, wherein said bent taper has a shape similar to the letter "S", a center radius $R_0$, and an offset dy measured as a lateral distance between said input and output ports, said bent taper configured to be represented as a plurality of segments of angular measure $d_\theta$.

12. The optical waveguide component of claim 11, wherein each of said plurality of segments of angular measure $d_\theta$ has the same angular measure.

13. The optical waveguide component of claim 11, wherein at least two of said plurality of segments of angular measure $d_\theta$ have different angular measure.

14. The optical waveguide component of claim 10, wherein said bi-layer taper and said bent taper are configured as a polarization rotator.

15. The optical waveguide component of claim 14, wherein said bi-layer taper is configured to provide a TM0-TE1 mode conversion; and wherein said bent taper is configured to provide TE1-TE0 mode conversion.

* * * * *